United States Patent
Tormasov et al.

(10) Patent No.: US 7,222,132 B2
(45) Date of Patent: May 22, 2007

(54) COMMON TEMPLATE FILE SYSTEM TREE FOR VIRTUAL ENVIRONMENTS AND VIRTUAL SERVERS

(75) Inventors: Alexander Tormasov, South San Francisco, CA (US); Serguei Beloussov, Monte Serino, CA (US); Stanislav Protassov, Singapore (SG); Yuri Pudgorodsky, South San Francisco, CA (US)

(73) Assignee: SWSoft Holdings, Ltd. (BM)

( * ) Notice: Subject to any disclaimer, the term of this patent is extended or adjusted under 35 U.S.C. 154(b) by 1280 days.

(21) Appl. No.: 09/908,252

(22) Filed: Jul. 18, 2001

(65) Prior Publication Data

US 2006/0089950 A1    Apr. 27, 2006

Related U.S. Application Data

(60) Provisional application No. 60/277,292, filed on Mar. 20, 2001.

(51) Int. Cl.
*G06F 12/00* (2006.01)

(52) U.S. Cl. .............. 707/200; 707/201; 709/201
(58) Field of Classification Search ........... 707/200, 707/201; 709/201
See application file for complete search history.

(56) References Cited

U.S. PATENT DOCUMENTS

| | | | |
|---|---|---|---|
| 5,313,646 A * | 5/1994 | Hendricks et al. | 707/101 |
| 5,905,990 A | 5/1999 | Inglett | |
| 6,035,379 A * | 3/2000 | Raju et al. | 711/162 |
| 6,560,613 B1 | 5/2003 | Gylfason et al. | |
| 6,618,736 B1 | 9/2003 | Menage | |
| 6,856,993 B1 * | 2/2005 | Verma et al. | 707/101 |

* cited by examiner

*Primary Examiner*—Alford Kindred
*Assistant Examiner*—Michael Le
(74) *Attorney, Agent, or Firm*—Bardmesser Law Group

(57) ABSTRACT

A common template file system tree is utilized by isolated operating system processes groups for effective read-only common file set access via multiple file system paths. Files are opened from different views of the file system template for write-ability access and copied into a private modification area; this is also convenient for subsequent online changes and replication.

35 Claims, 1 Drawing Sheet

COMMON TEMPLATE FILE SYSTEM TREE FOR VIRTUAL ENVIRONMENTS AND VIRTUAL SERVERS

REFERENCE TO RELATED APPLICATIONS

This application claims the benefit of U.S. Provisional Application for Patent No. 60/277292 titled "A Method of Effectively Reusing a Common Template File System Tree in an Environment With Concurrent Access and a Separate Private Modification Area" filed on Mar. 20, 2001 for priority under 35 U.S.C. § 119(e), is related thereto, is commonly assigned therewith, and the subject matter thereof is incorporated herein by reference in its entirety.

FIELD

The system of the present invention relates to the implementation of a common template computer data storage file system to be used in an operating environment including concurrent access from multiple operating systems.

BACKGROUND

The problem of effective utilization of computer resources, such as a data storage file system in a multi-user environment, has existed from virtually the first use of computers. In such data storage file systems, the data storage files are traditionally separated into several classes: the personal files of the user, the data storage files shared by all the users, temporary files, etc. The classes of these data storage files usually differ in their disposition in the data storage file system and in their access mode. Depending on the settings of the operating system, only the owner of the data storage file or someone with explicitly declared access rights has write-ability access to these data storage files. Everyone has write-ability access to temporary data storage files. The majority of users have read-only access to the general system files. In the system area, only the auxiliary data storage files are deposited. Therefore, the auxiliary data storage file provides the working information for the operating system.

Ordinary computer users generally are not interested in modifications of the content of system data storage files. Therefore, most often, all of the system data storage files, including the configuration of files, are usually seen by all the users of the operating system, and they are typically seen only in the read-only mode. Nevertheless, it is often necessary to provide for the possibility of multiple users making corrections to the system area. For example, for the configuration of system utilities, it is desirable that the unique data storage file modifications made by each computer user do not influence the configurations of others. This means that each computer user should be provided with an independent file system tree with the data storage files suitable for writing. If there are many such computer users with independent file systems on the same computer, it would be essential to implement an effective method for each computer user to access such data storage files. Traditionally, this problem is solved in two ways: 1) copying corresponding data storage files for each computer user; 2) using the data storage file system to create and support hard links. With these solutions, multiple references would need to be created to the same data storage file using different names.

Copying corresponding data storage files for each computer user leads to the multiple duplication of data storage files and is not an efficient use of data storage resources because of the typically large size of the system area. Another possible solution to this problem in the form of using the file system to create and support hard links, limits the user's ability to modify the data storage file system.

Since all of the users view the same system data storage file, its modification by one computer user will be immediately apparent to the other computer users who have access to the hard links of the same data storage file.

Thus, the need arises for an efficient solution that will allow many computer users to work on one physical computer. Each of the computer users has his/her own version, not only of their personal local data storage files, but also the system file area of the operating system.

Other prior art solutions have been discussed in the following references (See Bibliography). Partial solutions for this problem exist in many operating systems. For instance, in a UNIX type operating system, the primitive chroot is used to provide a certain level of security and separation for the computer users to allow them to have their own version of root data (Bach 1987, THE DESIGN AND IMPLEMENTATION OF THE 4.4BSD OPERATING SYSTEM). But this solution assumes that each computer user should have his/her own unique data storage file system tree and that the data storage file system tree cannot be effectively implemented.

Another partial solution is the separation of read and write operations provided by a so-called Union file system (Pendry 1995, THE DESIGN AND IMPLEMENTATION OF THE 4.4BSD OPERATING SYSTEM). The Union file system proposes a mount of one data storage file system tree on top of another tree. In such a case both trees become visible during the namespace lookup procedure. This allows the creation of separate write and read areas, but does not allow modification of data storage files which reside in the read-only area.

SUMMARY

The present invention offers a solution for the effective implementation of a multiple, partially shared tree of the data storage file system with the division of read-ability and write-ability streams in different areas of the namespace. As defined in OPERATING SYSTEMS: A DESIGN-ORIENTED APPROACH, namespace is a collection of unique names, where name is an arbitrary identifier, usually an integer or a character string (See CHARLES CROWLEY, OPERATING SYSTEMS: A DESIGN-ORIENTED APPROACH (Irwin, 1997) ISBN 0-256-15151-2). Usually the term "name" is applied to such objects as files, directories, devices, computers, etc. More information about typical distributed file system name space and related problems can be found in (Kumar 1991, Lebovitz 1992, The Distributed File System (DFS) for AIX/6000, Rosenberry 1992).

The search for a data storage file to be opened in the read-only mode is carried out in two stages. First, the search is done in the computer user's personal private area; and in case of failure, the search is done in the common read-only shared area. Writing to data storage files is carried out only in the computer user's personal private area. Thus, from the point of view of the computer user, the computer user has only one tree of the data storage file system that can be modified in every place. Nevertheless, only the differences between the data storage file system common to all of the users of the computer and the modified user copy is actually preserved. The common part of the data storage file is preserved on the computer only in one copy and does not need duplication. Operation parsing is carried out on its type. When a data storage file is opened in read-only mode, then if the private data storage file is present, it is opened in the private modification area. If not, the single copy of one data storage file from the shared data storage file system is opened.

When the data storage file is opened for write-ability and the private data storage file is present, the file is opened in the private area of the computer user. If the private data storage file is not present, the data storage file from the shared area is at first copied into the private area and only then it is opened. Such organization of the work of the data storage file system makes the implementation much easier for journaling because all the changes for each computer user are localized and are kept in his/her private area.

The data storage file being observed from different views of the same common template data storage file system is treated by the operation system as the only file. This promotes the efficient utilization of computer memory. For instance, if this data storage file contains executable code, the operation system stores in memory only the shared copy for all instances of processes using this data storage file from different views.

BRIEF DESCRIPTION OF THE DRAWING

A better understanding of the data storage system and method of the present invention may be had by reference to the drawing figure wherein.

DETAILED DESCRIPTION OF THE EMBODIMENTS

Figure 1:
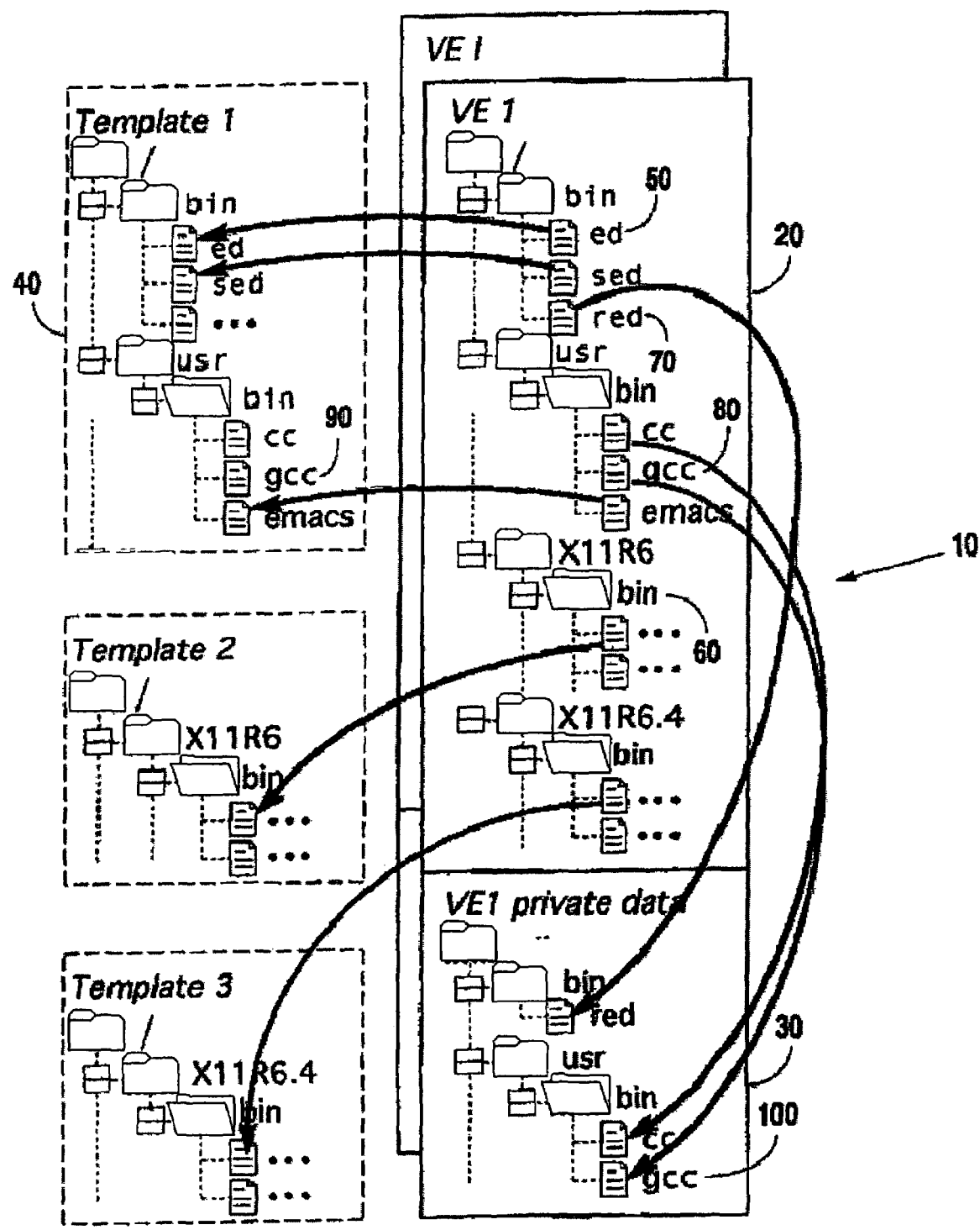
FIG. 1 is a schematic illustration of the relationship between a common root template of the data storage file system and the private modification area.

The disclosed invention describes a way to effectively implement multiple, partially shared trees of a data storage file system by separating the read-ability and write-ability streams into different areas of the namespace. Namespace is a collection of unique names, where name is an arbitrary identifier, usually an integer or a character string. Usually the term "name" is applied to such objects as files, directories, devices, computers, etc.

The idea behind the instant invention is that the disclosed system 10 separates the modified part of the data storage file system from the non-modified part of the data storage file system in such a way that it creates two complete data storage file system trees of the required area of the file system imposed upon each other. Specifically, as VE1 10 uses an integral data storage file system visible by the computer user; some visible data storage files exist only in some templates, and some visible files exist only in the private modification areas.

In the initial moment of time, the first data storage file system tree for read-only material contains the complete set of data storage files. The data storage file system tree for write-ability is empty, but it has the same directory structure.

FIG. 1 is a schematic illustration of the relationship between a common root template of the data storage file system and the private modification area. Data storage files could appear in read-only templates (see Template I 40) and in private modification areas (see VE1 private data 30) which are visible from the same data file storage tree (see VE1 20). Data storage files visible from VE1 20 could be placed in different read-only templates, as for example, data storage files with names "Ibin/ed" 50 and "/X11R6/bin" 60 here, or in a private area as for example, the data storage file "/bin/red" 70. Even if a data storage file such as "/usribin/gcc" 80 is available in both template, e.g., Template I 40, (see /usribin/gcc 90) and private modification area, e.g., VE1 private data 30, (see /usr/bin/gcc 100) the user will see only the file 100 in the private modification area 30.

As shown in FIG. 1, the first data storage file system tree 20 is never changed and is kept in one copy so that it can be seen by all of the computer users. The second data storage file system tree 30 is kept only in the personal private area of the computer user, and it is unique. If a search is made for some data storage file in such a structure, the data storage file is sought out twice: First, in the private tree 30 for write-ability; then second, in the common read-only tree 20, in the case of failure.

Opening of data storage files in the read-only mode is carried out in two stages. First, an attempt is made to open the data storage file in the personal private modification area of the computer user 30. Then in case of failure, the data storage file is opened in the common read-only shared area 20.

Writing data into data storage files is carried out only in the personal area of the computer user. At first, it is defined if such a data storage file exists in the personal area. And then it is opened for write-ability in the case of a successful search. If the data storage file does not exist, then the data storage file is copied into the private area 30 of the computer user from the shared data storage file system tree 20 and the obtained copy of the data storage file is opened to allow the writing of data to the data storage file.

Accordingly, from the point of view of the computer user, the computer user has only one data storage file system tree within the data storage file system that can be modified in every place. Nevertheless, only the difference between the data storage file system common to all of the users of the computer and the modified user copy is actually stored. The shared part of the data storage file system is preserved in the computer only in one copy, and it does not need duplication.

In case the data storage file is removed, the data storage file is just marked as removed in the personal area of the computer user and the search procedure, when such notation exists, is finished with the reply to the computer user that the file does not exist.

Such organization of work of the data storage file system sufficiently simplifies the implementation of journaling because all the changes for every computer user are localized and kept in his/her private area. The consequences of writing into a private area is conditioned by algorithms that: i) service the file system, and ii) could be easily tracked by special processes of the operating system that serve the procedures of journaling. Accordingly, this method for reusing a common template file system may form the separate private modification area as a transaction and could store the separate private modification area in a manner that allows the organization of the standard journaling.

Those of ordinary skill in the art will understand that numerous embodiments have been enabled by the above disclosed invention. Such other embodiments shall be included within the scope and meaning of the appended claims.

We claim:

1. A computer data storage file system comprising:
   a storage device;
   a namespace;
   a plurality of groups of isolated operating system processes;
   a common template file system tree stored on the storage device and concurrently accessed by the groups of isolated of operating system processes of the groups of isolated operating system processes using a view to the common template file system tree;
   a first set of names from the namespace for direct access of contents of the common template file system tree by the groups of isolated operating system processes;
   a private modification area accessed by the groups of isolated operating system processes for supporting the view; and
   a second set of names from the namespace used for direct access of files by the groups of isolated operating system processes in the private modification area, wherein the private modification area is formed as a journaled transaction, and wherein the private modification area stores an incremental difference between the files in the private modification area and the common template file system tree.

2. The system of claim 1, further comprising multiple views inside the common template file system tree;

wherein the namespace includes a third set of names associated with the groups of isolated operating system processes for use in establishing the multiple views, wherein read-only access to a file associated with the groups of isolated operating system processes using the third set of names utilizes the common template file system tree, and wherein, if the same files are opened from different views of the common template file system tree using a name from the third set of names, these files are cached only once in an operating system file buffer.

3. The system of claim 2, wherein a standard file system interface is utilized to enable file access that is transparent for the groups of isolated operating system processes.

4. The system of claim 2, wherein if a file already exists in the private modification area, the read access is performed on that file.

5. The system of claim 2, further comprising a transaction log, wherein contents of the transaction log corresponds to contents of the private modification area.

6. The system of claim 5, wherein the contents of the transaction log is kept up to date and the transaction log is used for online replication.

7. The system of claim 2, wherein a standard file system is utilized to enable file access that is transparent for any operating system process.

8. The system of claim 1, further comprising multiple views inside a file system name space to the common template file system tree;

wherein a view inside a file system namespace to the common template file system tree includes a third set of names of the namespace associated with a virtual environment for use in establishing the multiple views;

wherein the common template file system tree is utilized by the groups of isolated operating system processes using the third set of names; and wherein all files opened for write access are copied from the common template file system tree into the private modification area for performing the write access on the copy of the file.

9. The system of claim 8, wherein a standard file system is utilized to enable file access that is transparent for the groups of isolated operating system processes.

10. The system of claim 8, wherein:

if a file already exists in the private modification area, the write access is performed on that file, and if the file does not exist in the private modification area, then the file is copied to the private modification area prior to the write access.

11. The system of claim 8, wherein, if a file has been removed from the private modification area, a user is informed that the file does not exist.

12. A method of managing a computer file system comprising:

establishing a namespace;

launching a plurality of groups of isolated operating system processes;

establishing a first set of names from the namespace for direct access of the common template file system tree by the virtual environments;

establishing a common template file system tree for concurrent access by the groups of isolated operating system processes of the groups of isolated operating system processes using a view to the common template file system tree;

establishing a second set of names from the namespace for direct access of contents of files in a private modification area by the groups of isolated operating system processes;

accessing the private modification area by the isolated groups of operating system processes of the groups of isolated operating system processes; and providing accessed files from the private modification area to users of the groups of isolated operating system processes, wherein the private modification area is formed as a journaled transaction, and wherein the private modification area stores an incremental difference between user files and the common template file system tree, wherein, for shared files, only one copy of each shared file is cached by the operating system in memory, for all instances of processes using the shared files.

13. The method of claim 12, further comprising establishing multiple views inside the common template file system tree, wherein the namespace includes a third set of names associated with the groups of isolated operating system processes for use in establishing the multiple views, wherein read-only access to a file associated with the groups of isolated operating system processes using the third set of names utilizes the common template file system tree, and wherein, if the same files are opened from different views of the common template file system tree using a name from the third set of names, these files are cached only once in an operating system file buffer.

14. The method as defined in claim 13, wherein if a file already exists in the private modification area, the read access is performed on that file.

15. The method of claim 12, wherein a standard file system is utilized to enable file access that is transparent for the groups of isolated operating system processes.

16. The method of claim 12, further comprising generating a transaction log, wherein contents of the transaction corresponds to contents of the private modification area.

17. The method as defined in claim 16, further comprising keeping the transaction log up to date for online replication.

18. The method of claim 12, wherein a standard file system is utilized to enable file access that is transparent for any operating system process.

19. The method of claim 12, further comprising performing a write access on a file, wherein the namespace includes a third set of names associated with the groups of isolated operating system processes, and wherein all files opened for write access are copied from the common template file system tree into the private modification area prior to performing the write access.

20. The method of claim 19, wherein:

if a file already exists in the private modification area, performing the write access on that file, and if the file does not exist in the private modification area, copying the file to the private modification area prior to performing the write access on that file.

21. The method of claim 19, wherein, if a file has been removed from the private modification area, informing a user that the file does not exist.

22. A computer useable medium having computer program logic stored thereon for executing on a processor and managing a computer file system, the computer program logic comprising:
   computer program code means for establishing a namespace;
   computer program code means for launching a plurality of groups of isolated operating system processes;
   computer program code means for establishing a first set of names from the namespace for direct access of the common template file system tree by the virtual environments;
   computer program code means for establishing a common template file system tree for concurrent access by the groups of isolated operating system processes using a view to the common template file system tree;
   computer program code means for establishing a second set of names from the namespace for direct access of files in a private modification area by the groups of isolated operating system processes;
   computer program code means for accessing the private modification area by the isolated operating system processes; and
   computer program code means for providing accessed contents of files from the private modification area to users of the groups of isolated operating system processes,
   wherein the private modification area is formed as a journaled transaction, and
   wherein the private modification area stores an incremental difference between the files in the private modification area and the common template file system tree.

23. The computer useable medium of claim 22, further comprising computer program code means for establishing multiple views inside the common template file system tree;
   wherein the namespace includes a third set of names associated with the groups of isolated operating system processes for use in establishing the multiple views;
   wherein read-only access to a file associated with the groups of isolated operating system processes using the third set of names utilizes the common template file system tree; and
   wherein, if the same files are opened from different views of the common template file system tree using a name from the third set of names, these files are cached only once in an operating system file buffer.

24. The computer useable medium of claim 23, wherein if a file already exists in the private modification area, the read access is performed on that file.

25. The computer useable medium of claim 22, wherein a standard file system is utilized to enable file access that is transparent for the operating system.

26. The computer useable medium of claim 22, further comprising computer program code means for generating a transaction log, wherein contents of the transaction corresponds to contents of the private modification area.

27. The computer useable medium of claim 26, further comprising computer program code means for keeping the transaction log up to date for online replication.

28. The computer useable medium of claim 22, wherein a standard file system is utilized to enable file access that is transparent for the operating system processes.

29. The computer useable medium of claim 22, further comprising computer program code means for performing a write access on a file,
   wherein the namespace includes a third set of names associated with the operating system processes,
   wherein the common template file system tree is utilized by the groups of isolated operating system processes, and
   wherein all files opened for write access are copied from the common template file system tree into the private modification area prior to performing the write access.

30. The computer useable medium of claim 29, further comprising:
   if a file already exists in the private modification area, computer program code means for performing the write access on that file, and
   if the file does not exist in the private modification area, computer program code means for copying the file to the private modification area prior to performing the write access on that file.

31. The computer useable medium of claim 29, wherein, if a file has been removed from the private modification area, informing a user that the file does not exist.

32. The computer useable medium of claim 22, wherein a standard file system is utilized to enable file access that is transparent for any operating system process.

33. The system of claim 1, wherein the system uses the first set of names from the namespace for direct access, using only a single redirect, of the common template file system tree by the groups of isolated operating system processes, and
   wherein the system uses the second set of names from the namespace for direct access of files only in the private modification area and without a redirect to outside the private modification area.

34. A computer data storage file system comprising:
   a storage device;
   a namespace;
   a plurality of groups of isolated operating system processes;
   a common template file system tree stored on the storage device and concurrently accessed by the groups of isolated of operating system processes of the groups of isolated operating system processes using a view to the common template file system tree;
   a first set of names from the namespace for direct access, using only a single redirect, of the common template file system tree by the groups of isolated operating system processes;
   a private modification area accessed by the groups of isolated operating system processes for supporting the view; and
   a second set of names from the namespace used for direct access of files only in the private modification area and without a redirect to outside the private modification area, by the groups of isolated operating system processes.

35. The system of claim 34, wherein the private modification area is formed as a journaled transaction,
   wherein the private modification area stores an incremental difference between user files and the common template file system tree,
   wherein, for shared files, only one copy of each shared file is cached by the operating system in memory, for all instances of processes using the shared files.

* * * * *